United States Patent
Furuta

(10) Patent No.: US 10,543,546 B2
(45) Date of Patent: Jan. 28, 2020

(54) WIRE ELECTRIC DISCHARGE MACHINE INCLUDING AVERAGE DISCHARGE DELAY TIME CALCULATING UNIT

(71) Applicant: FANUC Corporation, Yamanashi (JP)

(72) Inventor: Tomoyuki Furuta, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 296 days.

(21) Appl. No.: 15/723,156

(22) Filed: Oct. 2, 2017

(65) Prior Publication Data

US 2018/0036816 A1 Feb. 8, 2018

Related U.S. Application Data

(62) Division of application No. 14/338,848, filed on Jul. 23, 2014, now Pat. No. 9,833,853.

(30) Foreign Application Priority Data

Jul. 24, 2013 (JP) .................................. 2013-153978
Apr. 9, 2014 (JP) .................................. 2014-080318

(51) Int. Cl.
*B23H 1/02* (2006.01)
*B23H 7/04* (2006.01)
(Continued)

(52) U.S. Cl.
CPC ................ *B23H 7/18* (2013.01); *B23H 1/022* (2013.01); *B23H 7/04* (2013.01); *B23H 7/20* (2013.01)

(58) Field of Classification Search
CPC ........ B23H 1/02–028; B23H 7/02–065; B23H 7/14–20; G05B 2219/45221
See application file for complete search history.

(56) References Cited

U.S. PATENT DOCUMENTS 4,404,448 A * 9/1983 Bommeli ................. B23H 7/18
                                                      219/69.14
5,545,870 A    8/1996 Fujii et al.
(Continued)

FOREIGN PATENT DOCUMENTS

CN    101259551 A    9/2008
CN    101631638 B    4/2012
(Continued)

OTHER PUBLICATIONS

Office Action in CN Application No: 201410354376.2, dated May 20, 2016.

(Continued)

*Primary Examiner* — Michael A Laflame, Jr.
(74) *Attorney, Agent, or Firm* — Hauptman Ham, LLP

(57) ABSTRACT

In a wire electric discharge machine, time from application of a voltage to a machining gap between a workpiece and a wire electrode until occurrence of electric discharge is measured as a discharge delay time, and the measured discharge delay time is integrated over a predetermined measurement period to calculate a discharge delay integrated time. Further, the number of times of the voltage application in the measurement period is counted. An average discharge delay time per voltage application in the measurement period is calculated from the discharge delay integrated time and the number of times of voltage application. The movement of the wire electrode with respect to the workpiece is controlled on the basis of the average discharge delay time.

1 Claim, 12 Drawing Sheets

(51) Int. Cl.
*B23H 7/20* (2006.01)
*B23H 7/18* (2006.01)

(56) References Cited

U.S. PATENT DOCUMENTS

| | | | |
|---|---|---|---|
| 6,169,262 | B1 | 1/2001 | Lee et al. |
| 2002/0060205 | A1 | 5/2002 | Tamida et al. |
| 2003/0098294 | A1 | 5/2003 | Goto et al. |
| 2004/0075966 | A1 | 4/2004 | Murai et al. |
| 2004/0193306 | A1 | 9/2004 | Kurihara et al. |
| 2007/0023400 | A1* | 2/2007 | Buhler ............ B23H 1/022 219/69.18 |
| 2010/0090708 | A1 | 4/2010 | Kaneko et al. |
| 2012/0048833 | A1 | 3/2012 | Kawahara et al. |
| 2013/0193112 | A1 | 8/2013 | Murai et al. |
| 2014/0083980 | A1* | 3/2014 | Mai ................. B23H 7/20 219/69.13 |
| 2019/0270151 | A1* | 9/2019 | Iwabuchi ............ B23H 1/024 |

FOREIGN PATENT DOCUMENTS

| | | |
|---|---|---|
| EP | 2269755 A2 | 1/2011 |
| EP | 2422911 A2 | 2/2012 |
| JP | 50-1499 A | 1/1975 |
| JP | 55-101333 A | 8/1980 |
| JP | 2-109633 A | 4/1990 |
| JP | 2-298426 A | 12/1990 |
| JP | 7-246519 A | 9/1995 |
| JP | 2002-160127 A | 6/2002 |
| JP | 2002-160128 A | 6/2002 |
| JP | 2002-254250 A | 9/2002 |
| JP | 2003-165030 A | 6/2003 |
| JP | 2004-136410 A | 5/2004 |
| JP | 2004-283968 A | 10/2004 |
| JP | 2010-280046 A | 12/2010 |
| JP | 5204321 B1 | 6/2013 |

OTHER PUBLICATIONS

Office Action in JP Application No. 2014-080318, dated Jan. 6, 2015.
Extended European Search Report in EP Application No. 14175700.5, dated Jan. 12, 2015.

* cited by examiner

AFTER MACHINING GAP VOLTAGE IS HALF-WAVE RECTIFIED
ONLY ON POSITIVE POLARITY SIDE

AFTER MACHINING GAP VOLTAGE IS HALF-WAVE RECTIFIED ONLY ON NEGATIVE POLARITY SIDE

DISCHARGE DELAY TIME MEASUREMENT PERIOD ($350\mu s$)

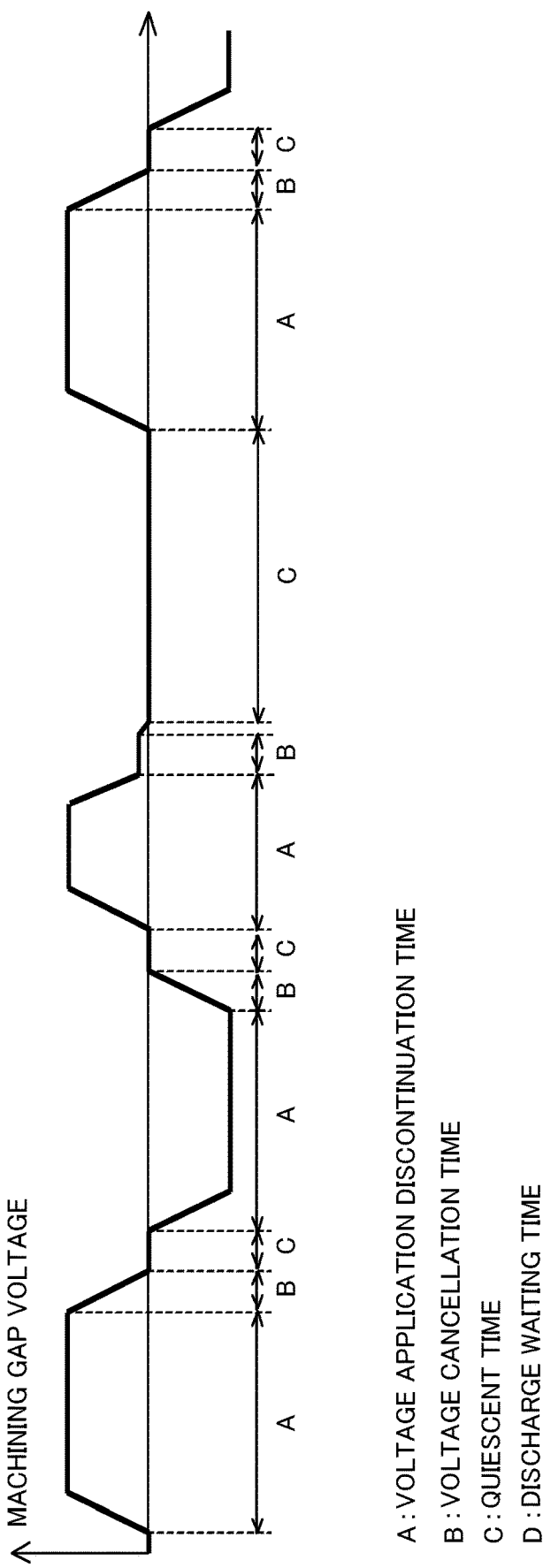

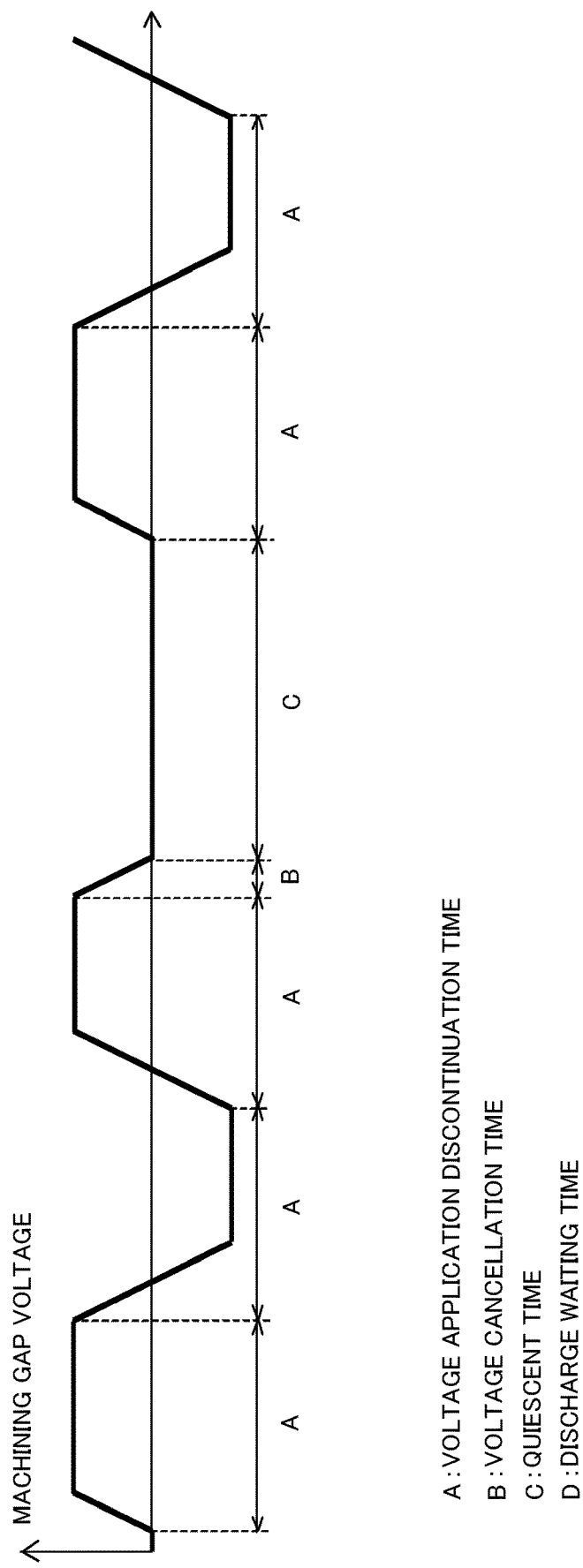

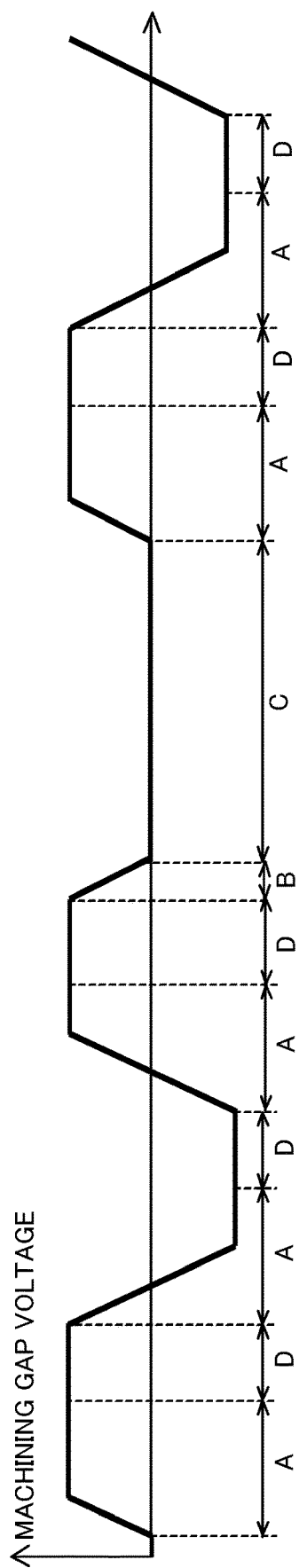

WIRE ELECTRIC DISCHARGE MACHINE INCLUDING AVERAGE DISCHARGE DELAY TIME CALCULATING UNIT

RELATED APPLICATIONS

The present application is a division of U.S. patent application Ser. No. 14/338,848 filed on Jul. 23, 2014, which claims priority of Japanese Application Number 2013-153978 filed Jul. 24, 2013 and Japanese Application Number 2014-080318 filed Apr. 9, 2014. The contents of all of the above-listed prior applications are incorporated by reference herein in their entireties.

BACKGROUND OF THE INVENTION

1. Field of the Invention

The present invention relates to a wire electric discharge machine including an average discharge delay time calculating unit.

2. Description of the Related Art

In general, a wire electric discharge machine executes machining gap average voltage fixed servo feed control for obtaining a fixed discharge gap by controlling a voltage between a wire electrode and a workpiece (a machining gap voltage) such that an average of measured voltages (a machining gap average voltage) in a gap between the wire electrode and the workpiece (a machining gap) coincides with a target value.

In executing the machining gap average voltage fixed servo feed control, in general, the wire electric discharge machine calculates the machining gap average voltage by full-wave rectifying the machining gap voltage with a full-wave rectifier circuit and converting the machining gap voltage into a voltage waveform close to a direct current with a low-pass filter circuit. When the machining gap average voltage is calculated in this way, even if a machining gap voltage waveform is the same, an error occurs in a measurement value depending on a machine because of a measurement error of an analog circuit. Therefore, it is sometimes difficult to accurately reproduce machining. A voltage waveform appearing in the machining gap when electric discharge occurs has a wide variety of frequency components from several ten kilohertz to several ten megahertz. Therefore, an error occurs in a machining gap average voltage obtained from a measurement circuit because of errors in frequency characteristics of components included in the analog circuit and individual differences of specifications of the components.

To solve this problem, Japanese Patent Application Laid-open No. 50-1499 discloses a technique for detecting a no-load time (hereinafter referred to as "discharge delay time") from application of a voltage to a machining gap until occurrence of electric discharge and performing servo feed such that the detected discharge delay time coincides with a predetermined time. In electric discharge machining, it is known that, when a voltage applied between the wire electrode and the workpiece is fixed, there is a correlation between the discharge delay time from the application of the voltage until the occurrence of the electric discharge and a gap amount between the wire electrode and the workpiece.

However, in actual machining, all discharges do not always occur in completely the same discharge delay time every time. The discharge delay time greatly fluctuates in every voltage application centering on a value obtained from the correlation between the discharge delay time and the gap amount. In particular, in a situation in which a large quantity of large conductive sludge floats in the machining gap such as rough machining or two-time machining, electric discharge sometimes occurs immediately after the voltage application. The discharge delay time in that case is a value much smaller than a value corresponding to an actual machining gap. As a result, a fed speed command to a servo greatly fluctuates in every voltage application, control becomes unstable, and, as a result of machining, it is extremely difficult to obtain a fixed machining groove width.

To solve this problem, Japanese Patent Application Laid-open No. 55-101333 discloses a technique for integrating a discharge delay time from voltage application until occurrence of electric discharge for a predetermined period, comparing an integrated value of the discharge delay time with an upper limit threshold and a lower limit threshold set in advance, and controlling a relative distance between a wire electrode and a workpiece according to a result of the comparison. Further, Japanese Patent Application Laid-open No. 2-109633 discloses a technique for totaling discharge delay times at every predetermined sampling cycle, applying a low-pass filter for a predetermined cutoff frequency to a total value of the discharge delay times to perform filter processing to remove a sudden change, and controlling a relative position between a wire electrode and a workpiece such that a value subjected to the filter processing coincides with a predetermined value.

In both of the two patent documents mentioned above, the discharge delay time in the predetermined period is integrated and the wire electrode is servo-fed with respect to the workpiece such that the integrated value coincides with the predetermined value. Therefore, since a wire electric discharge machine less easily responds to a sudden change in the discharge delay time due to fluctuation in the discharge delay time and electric discharge via the sludge, controllability is considered to be stabilized to a certain degree.

Japanese Patent Application Laid-open No. 7-246519 discloses a technique for detecting the number of times of electric discharge in every predetermined period, dividing a period of the detection by the detected number of times of electric discharge to thereby calculate a total time per electric discharge, and subtracting an energization time and a quiescent time set in advance from the total time to calculate an average discharge delay time.

On the other hand, there is also a technique for calculating, rather than a discharge delay time, a machining gap voltage corresponding to the discharge delay time and performing feed control. Japanese Patent Application Laid-open No. 2003-165030 discloses a method of measuring a machining gap average voltage including a quiescent time, preparing in advance, in a table, a correction value for calculating a machining gap average voltage (a corrected machining gap average voltage) excluding the quiescent time, based on a value of the machining gap average voltage and the set quiescent time, and calculating a machining gap average voltage not including the quiescent time, using a machining gap average voltage after correction obtained from the table.

Japanese Patent Application Laid-open No. 2-298426 discloses a method of dividing a sum TB of discharge delay times of a discharge pulse in a predetermined time (a measurement time TA) by the measurement time TA to calculate a time ratio (TB/TA) and multiplying the calculated time ratio by a reference voltage E set in advance to calculate an average voltage V (=(TB/TA)×E). Japanese Patent Application Laid-open No. 2004-136410 discloses a method of calculating an average voltage V according to an expression V={(Ta−N×(Ton+Toff))/Ta}×E from a machining gap voltage E, a quiescent time Toff during electric discharge, an energization time Ton during electric discharge, a measurement time Ta, and the number of times of electric discharge N measured in the measurement time Ta.

In the techniques disclosed in Japanese Patent Application Laid-open No. 50-1499 and Japanese Patent Application Laid-open No. 55-101333, the discharge delay time is integrated at every predetermined sampling frequency or in the predetermined period. Therefore, a measurement period of the discharge delay time is fixed. Moreover, the number of times of voltage application is not taken into account in the measurement of the discharge delay time.

In wire electric discharge machining, an auxiliary power supply for inducing electric discharge is connected to a machining gap. When electric discharge by the auxiliary power supply is detected, a main power supply is connected to the machining gap to apply a machining current. After the application of the machining current, for prevention of disconnection, in general, a quiescent time during which a voltage is not applied is inserted. If the machining is stable, the electric discharge occurs at a substantially fixed rate and the quiescent time is inserted at a substantially fixed rate. However, when a flow of machining liquid changes in a step portion of workpiece and discharge of sludge is deteriorated or a facing area of a wire electrode and the workpiece suddenly changes in a corner portion of the workpiece and an electric discharge frequency changes, the number of times of electric discharge in the fixed measurement time changes and a rate of the quiescent time in the measurement period greatly changes. Therefore, the number of times of voltage application included in the measurement time greatly increases and decreases.

If the machining is stable and a gap amount of the machining gap is fixed, the discharge delay time is also fixed. In a state of the stable machining, if the number of times of voltage application in the predetermined measurement period is large, an integrated value of the discharge delay time must be large. If the number of times of voltage application is small, the integrated value must be small. In this way, as a result of the change in the electric discharge frequency, when it is attempted to fix the integrated value of the discharge delay time irrespective of the fact that the number of times of voltage application in the predetermined measurement period changes, the gap amount of the machining gap cannot be controlled to be fixed.

Further, when an amount and a direction of a bend of a wire change and a machining gap average voltage suddenly drops because of, for example, the change in the flow of the machining liquid and it is determined that a machining gap state is close to a short circuit, the quiescent time may suddenly be increased. When a machining amount suddenly changes in the corner portion or a cutting start portion, to reduce the electric discharge frequency to stabilize the machining, the quiescent time may be sometimes greatly extended.

As the quiescent time to be inserted in such a case, a long time of several hundred microseconds to several milliseconds is sometimes necessary. In Japanese Patent Application Laid-open No. 55-101333 and Japanese Patent Application Laid-open No. 2-109633, as explained above, the measurement time of the discharge delay time is fixed and, moreover, the number of times of voltage application during the measurement period is not taken into account at all. Therefore, the integrated value of the measured discharge delay time is a value having no correlation with the gap amount between the workpiece and the wire electrode.

When such a long quiescent time is inserted, the measurement time is sometimes completely included in the inserted quiescent time. In this case, integration of the discharge delay time (a no-load time from application of a voltage to the machining gap until occurrence of an electric discharge) is zero. Therefore, an actual machining gap state is not reflected at all. Further, when discharge delay time fixed control is performed in a state in which the integration of the discharge delay time is zero, relative speed between the wire electrode and the workpiece becomes extremely low and the discharge delay time becomes long. Therefore, as a result of the machining, a fixed machining groove cannot be obtained.

In the case of a general wire discharge machining method by machining gap average voltage fixed servo feed control for controlling a machining gap average voltage subjected to averaging processing by a full-wave rectifier circuit or a low-pass filter circuit to be fixed, when a large quiescent time is inserted for the purpose of reducing an electric discharge frequency and reducing a machining amount, an average voltage drops and machining speed decreases. For example, in finishing an outer corner portion of a workpiece, when control is performed to insert a long quiescent time for the purpose of reducing a machining amount, taking into account a decrease in a necessary machining amount, if a shape having many corners is machined, machining speed is extremely low at each of the corners. Therefore, a machining time is extremely long.

In both of the techniques for calculating a machining gap voltage disclosed in Japanese Patent Application Laid-open No. 2-298426 and Japanese Patent Application Laid-open No. 2004-136410, the rate of the discharge delay time in the predetermined measurement period is calculated and the rate is multiplied by the reference voltage to obtain the average voltage. That is, the rate of the integrated value of the discharge delay time to the predetermined measurement time is measured to approximately calculate the machining gap average voltage calculated by the conventional analog circuit. Therefore, the average voltage is fundamentally different from a machining gap voltage based on an accurate average discharge delay time that is to be calculated in the present invention. For example, when the quiescent time is extended, naturally, the rate of the integrated value of the discharge delay time to the predetermined measurement time decreases and the calculated average voltage also decreases. In this way, the calculated average voltage is greatly affected by the quiescent time and the number of times of voltage application is not taken into account. Therefore, the average time has no correlation with an accurate average discharge delay time having a correlation with a gap amount of a machining gap.

SUMMARY OF THE INVENTION

Therefore, it is an object of the present invention to provide an average discharge delay time calculating unit that measures an accurate average discharge delay time having a correlation with a gap amount of a machining gap and provide a wire electric discharge machine capable of performing more stable machining.

A wire electric discharge machine according to the present invention applies, while moving a relative position of a table with respect to a wire electrode, a voltage to a machining gap between the wire electrode and a workpiece arranged on the table to generate electric discharge and machines the workpiece. The wire electric discharge machine includes a measuring unit configured to measure, as a discharge delay time, a no-load time from the application of the voltage to the machining gap until occurrence of the electric discharge, and integrate the measured discharge delay time over a predetermined measurement period to calculate a discharge delay integrated time; a counting unit configured to count the number of times of the voltage application in the predetermined measurement period; and an average discharge delay time calculating unit configured to calculate an average discharge delay time per voltage application in the predetermined measurement period from the discharge delay integrated time calculated by the measuring unit and the number of times of voltage application calculated by the counting unit.

According to the present invention, it is possible to provide an average discharge delay time calculating unit that accurately measures a discharge delay time reflecting a machining gap state and provide a wire electric discharge machine capable of performing highly accurate and stable machining compared with the conventional techniques. Further, it is possible to greatly improve stability of machining without affecting a machining state and machining accuracy during the machining by, while performing relative position control between a workpiece and a wire electrode according to a publicly-known technique, accurately estimating a gap amount of a machining gap according to an accurately measured average discharge delay time and performing a stop of voltage application to the machining gap and deceleration, a stop, receding, and the like with respect to relative speed between the workpiece and the wire electrode.

BRIEF DESCRIPTION OF THE DRAWINGS

The above and other objects and features of the present invention will be apparent from the following description of embodiments with reference to the accompanying drawings, in which:

FIG. 10 is an example of a machining gap voltage waveform during rough machining;

FIG. 11 is an example of a machining gap voltage waveform during finishing for performing machining only with energy charged in stray capacitance of a machining gap and capacitance of a cable; and FIG. 12 is an example of a machining gap voltage waveform during finishing for performing machining only with energy charged in stray capacitance of a machining gap and capacitance of a cable.

DESCRIPTION OF THE PREFERRED EMBODIMENTS

Figure 1:
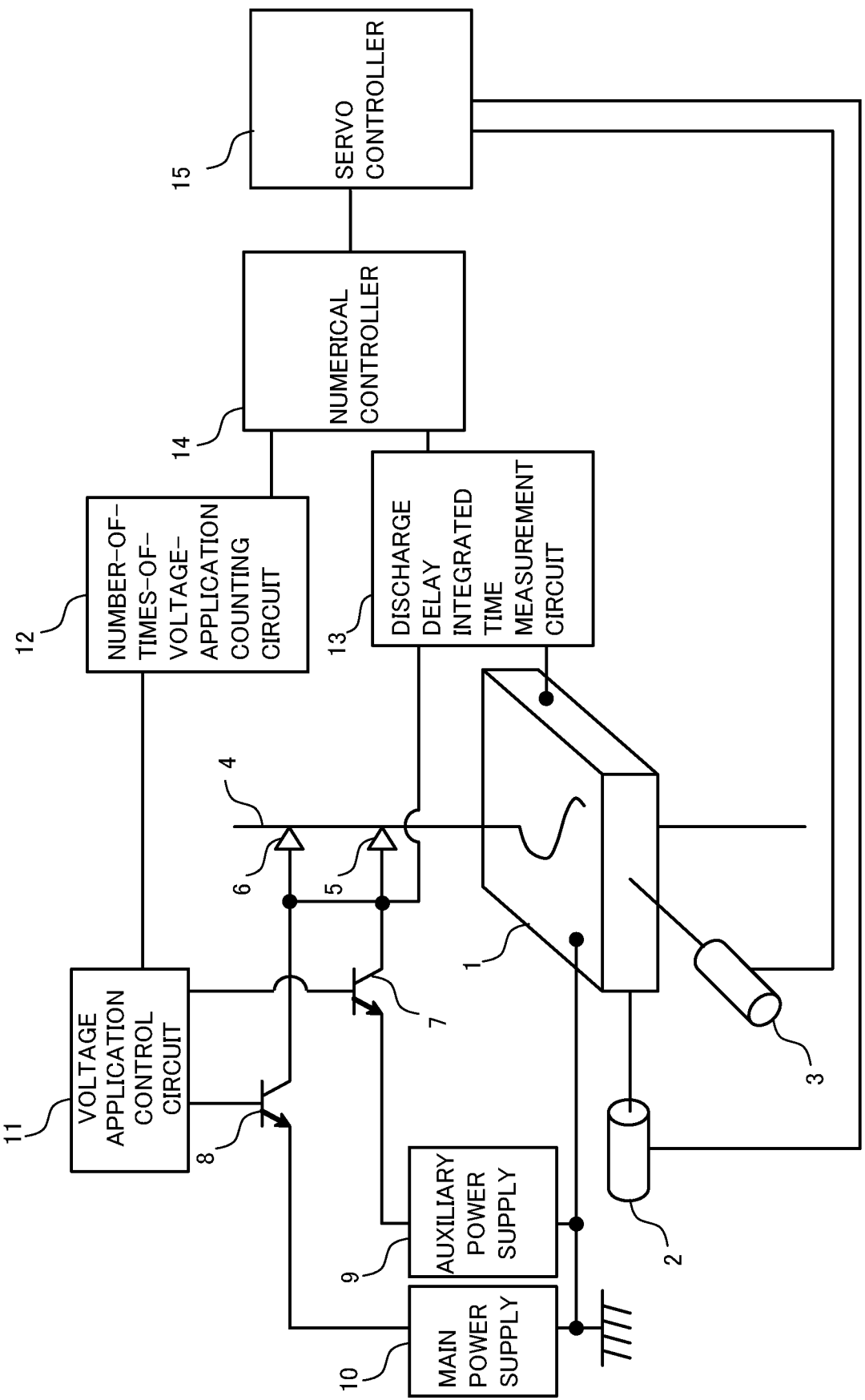
FIG. 1 is a block diagram for explaining a wire electric discharge machine according to the present invention.

In machining control by a wire electric discharge machine according to the present invention, a discharge delay integrated time obtained by integrating a discharge delay time in a predetermined measurement period (a discharge delay time measurement period) and the number of times of voltage application in the measurement time are measured. An average discharge delay time in every measurement period is calculated from the measured discharge delay integrated time and the measured number of times of voltage application.

A wire electric discharge machine according to the present invention is explained with reference to the block diagram of FIG. 1.

Workpiece 1 is attached to a table (not shown) and enabled to move on an XY plane by servomotors 2 and 3 that drive the table in orthogonal X and Y axis directions. A wire electrode 4 is extended in a direction orthogonal to the XY plane and configured to travel in the direction.

An auxiliary power supply 9 and a main power supply 10 are provided that apply voltages (to a machining gap) between the wire electrode 4 and the workpiece 1. The auxiliary power supply 9 is a power supply for inducing electric discharge between the wire electrode 4 and the workpiece 1. The main power supply 10 is a power supply for applying a machining current (a discharge current) after the electric discharge is induced. First terminals of the auxiliary power supply 9 and the main power supply 10 are connected to the workpiece 1 and second terminals thereof are connected to the wire electrode 4 by conductors 5 and 6 via switching elements (transistors) 7 and 8.

The switching elements 7 and 8 are subjected to ON/OFF control by a voltage application control circuit 11. First, the voltage application control circuit 11 turns on the switching element 7 and applies a voltage for discharge induction between the wire electrode 4 and the workpiece 1 from the auxiliary power supply 9. When electric discharge is detected in a discharge detection circuit (not shown), the voltage application control circuit 11 turns on the switching element 8, applies a machining current between the wire electrode 4 and the workpiece 1 from the main power supply 10, turns off the switching element 7, and turns off power supply of the auxiliary power supply 9.

A number-of-times-of-voltage-application counting circuit 12 is a circuit that counts the number of times a voltage is applied between the wire electrode 4 and the workpiece 1 in a predetermined measurement period. A discharge delay integrated time measurement circuit 13 is a circuit that measures a discharge delay time (a no-load time from application of a voltage to a machining gap until occurrence of an electric discharge) (a discharge delay integrated time) integrated in the predetermined measurement period.

A numerical controller 14 reads counted values of the number-of-times-of-voltage-application counting circuit 12 and an integrated time of the discharge delay integrated time measurement circuit 13 and calculates an average discharge delay time per voltage application in the predetermined measurement period from the read number of times of voltage application and the read discharge delay integrated time. The numerical controller 14 outputs a movement command for the servomotors 2 and 3 to a servo controller 15 on the basis of the calculated average discharge delay time.

The servo controller 15 drives the servomotors 2 and 3 on the basis of the movement command for the servomotors 2 and 3 output from the numerical controller 14 to control relative movement of the wire electrode 4 and the workpiece 1 and performs servo feed control for retaining a fixed gap between the wire electrode 4 and the workpiece 1.

Examples of machining control executed by the wire electric discharge machine are explained.

First, a first example of the machining control executed by the wire electric discharge machine is explained.

The wire electric discharge machine includes a discharge delay integrated time measuring unit configured to integrate a no-load time (a discharge delay time) from application of a voltage to a machining gap until occurrence of an electric discharge over a predetermined measurement period, a number-of-times-of-voltage-application counting unit configured to count the number of times of voltage application in the predetermined measurement period, and an average discharge delay time calculating unit configured to calculate an average discharge delay time per voltage application in the predetermined measurement period from the discharge delay integrated time measured by the discharge delay integrated time measuring unit and the number of times of voltage application counted by the number-of-times-of-voltage-application counting unit.

The discharge delay integrated time measurement circuit 13 shown in FIG. 1 configures the discharge delay integrated time measuring unit, the number-of-times-of-voltage-application counting circuit 12 shown in FIG. 1 configures the number-of-times-of-voltage-application counting unit, and the numerical controller 14 shown in FIG. 1 configures the average discharge delay calculating unit.

Figure 2:
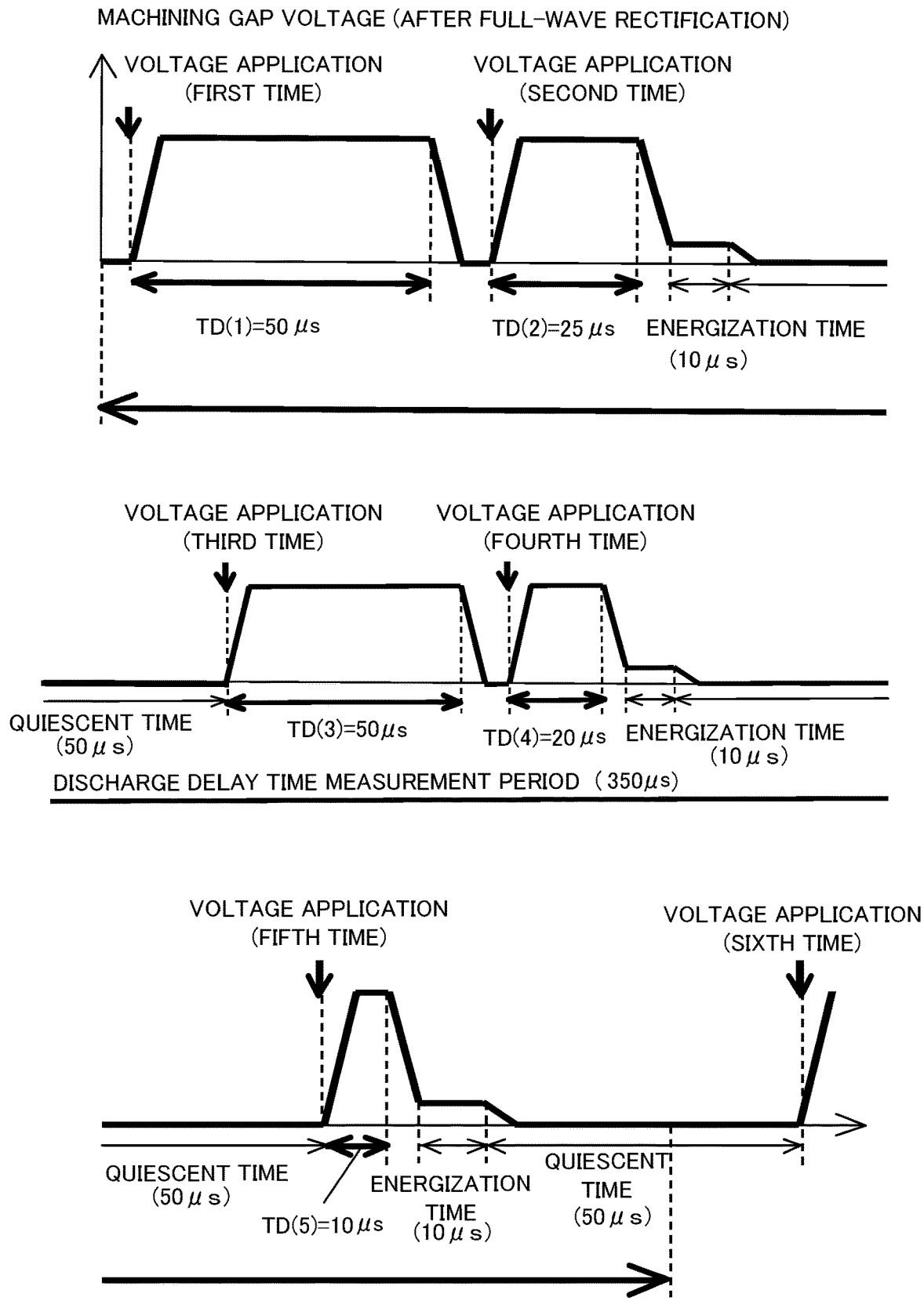
FIG. 2 is an example of a waveform obtained by full-wave rectifying a machining gap voltage waveform during rough machining (an energization time is 10 μs and a quiescent time is 50 μs)
Figure 3:
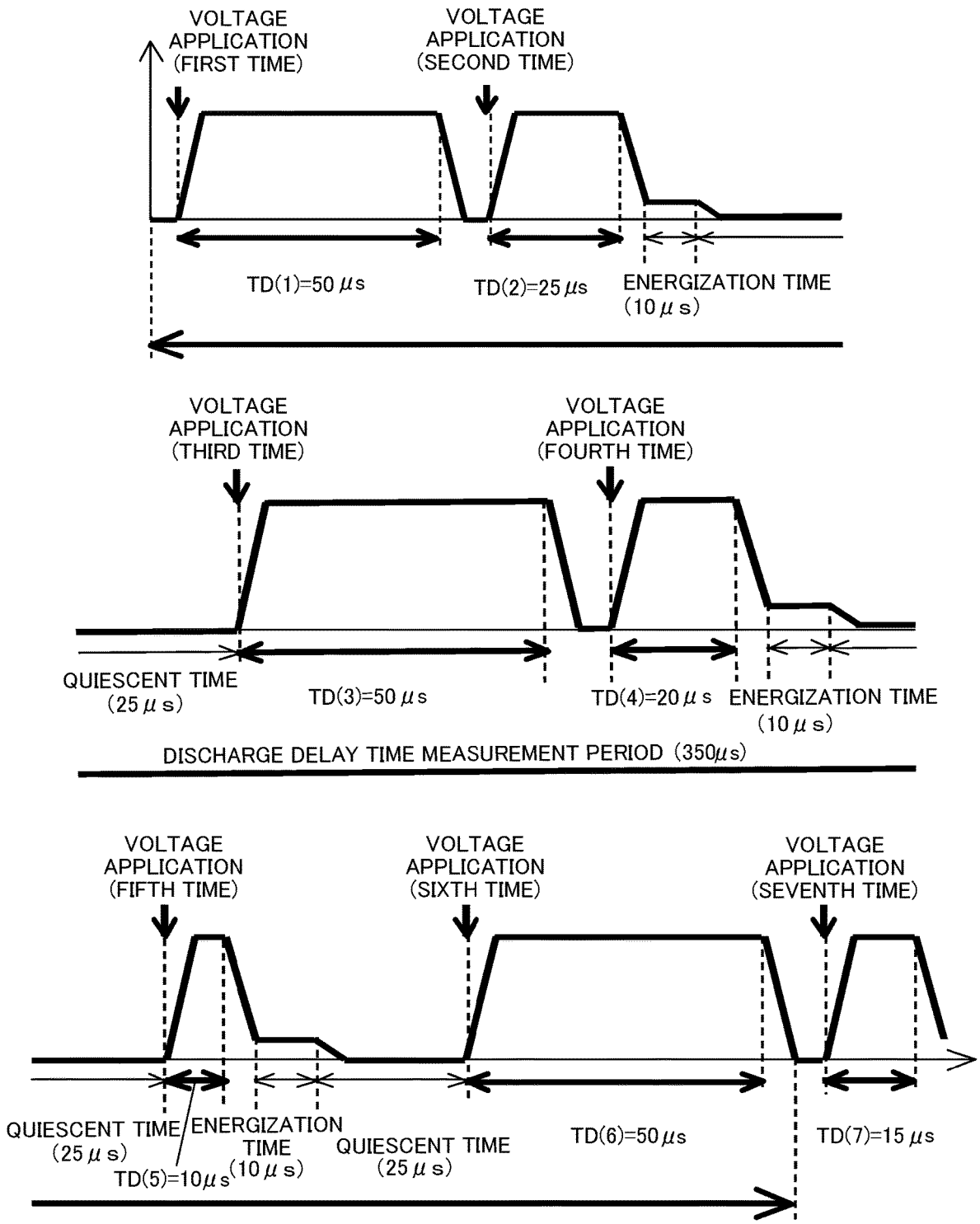
FIG. 3 is an example of a waveform obtained by full-wave rectifying a machining gap voltage waveform during rough machining (an energization time is 10 μs and a quiescence time is 50 μs)

FIGS. 2 and 3 are examples of waveforms obtained when a machining gap voltage during rough machining is full-wave rectified. Since an electric discharge does not occur in the first time and the third time of voltage application, a quiescent time is not inserted before an application start of the next times (the second time and the fourth time). In the second time, the fourth time, and the fifth time of the voltage application, an energization time in which an electric discharge occurs and a machining current is fed and a quiescent time for wire cooling and sludge removal are inserted. In FIG. 2, the energization time is 10 μs and the quiescent time is 50 μs. In FIG. 3, the energization time is 10 μs (same as the energization time in FIG. 2) but the quiescent time is 25 μs (shorter than the quiescent time in FIG. 2). In FIG. 3, compared with FIG. 2, the quiescent time is short. As a result, the sixth time of the voltage application is inserted in the measurement period (a discharge delay time measurement period of 350 μs). However, concerning the first to fifth times of the voltage application, a voltage waveform other than the quiescent time is completely the same.

Effectiveness of the present invention is examined with reference to the waveforms shown in FIGS. 2 and 3.

(1) First, as in the technique disclosed in Japanese Patent Application Laid-open No. 50-1499, a discharge delay time is measured and controlled to be fixed. The predetermined measurement period for measuring a discharge delay time is set to 350 μs in FIGS. 2 and 3.

As shown in FIG. 2, an electric discharge does not always occur every time a voltage is applied. Therefore, the discharge delay time greatly changes in every voltage application. In the example shown in FIG. 2, whereas a discharge delay time TD(1) of the voltage application (the first time) is 50 μs, a discharge delay time TD(5) of the voltage application (the fifth time) is 10 μs. That is, the discharge delay time changes from 10 μs to 50 μs.

In such a waveform, for example, if it is attempted to control the discharge delay time to be 30 μs (a fixed value), when the discharge delay time is 50 μs, a deviation from the target value is 50−30=20 μs. When the discharge delay time is 10 μs, the deviation is 10−30=−20 μs. When the deviation is multiplied by a proportional gain to perform proportional control, a speed command value for driving the servomotors 2 and 3 is not always commanded in a progress direction of machining but is commanded in a backward direction. Therefore, stable feed control cannot be realized.

As explained above, although a correlation is recognized between the discharge delay time and the size of the machining gap, an actual discharge delay time greatly fluctuates centering on a value obtained from the correlation. In particular, in rough machining, two-time machining, or the like, when a machining amount in one machining is large and a large amount of sludge is interposed in the machining gap, even in a state in which electric discharge is stable, the electric discharge sometimes does not occur after voltage application or the electric discharge sometimes immediately occurs via the sludge after the voltage application. Therefore, if a discharge delay time is calculated in every voltage application to control a servo, a command value greatly fluctuates. Therefore, it is likely that oscillation occurs depending on a control system. As a result of machining, it is extremely difficult to obtain a fixed machining groove width.

(2) As in the techniques disclosed in Japanese Patent Application Laid-open No. 55-101333 and Japanese Patent Application Laid-open No. 2-109633, a discharge delay time is integrated and calculated in every predetermined measuring period.

As shown in FIG. 2, when a discharge delay time measurement period, which is a predetermined period, is set to 350 μs and an integrated value of a discharge delay time is measured, an integrated value TDsum of the discharge delay time shown in FIG. 2 is calculated as follows:

$$TDsum = TD(1) + TD(2) + TD(3) + TD(4) + TD(5)$$
$$= 50 + 25 + 50 + 20 + 10 = 155 \ \mu s.$$

On the other hand, in the case of FIG. 3 in which a quiescent time is set to 25 μs (a half of 50 μs in FIG. 2), the integrated value TDsum in the measurement period is calculated as follows:

$$TDsum = TD(1) + TD(2) + TD(3) + TD(4) + TD(5) + TD(6)$$
$$= 50 + 25 + 50 + 20 + 10 + 50 = 205 \text{ μs}.$$

The discharge delay times (TD(1), TD(2), TD(3), and the like) in FIGS. 2 and 3 are completely the same. However, as a result of a change in the quiescent time, the integrated value of the discharge delay time changes from 155 μs to 205 μs (+32%).

"A calculation method for an accurate discharge delay time" is to divide an integrated value of a discharge delay time in a predetermined measurement period (in the example shown in FIGS. 2 and 3,350 μs) by the number of times of voltage application. That is, in the case of FIG. 2, the discharge delay time is 155 μs/5 times=31 μs. In the case of FIG. 3, the discharge delay time is 205 μs/6 times≅34 μs (+10%). That is, it is seen that, actually, there is no large difference between the discharge delay times in FIGS. 2 and 3.

On the other hand, in the techniques disclosed in Japanese Patent Application Laid-open No. 55-101333 and Japanese Patent Application Laid-open No. 2-109633, as explained above, since the rate of change of the average discharge delay time in FIG. 3 with respect to FIG. 2 is +32%, an error of +22% occurs in +10% of a value obtained by the calculation method for an accurate discharge delay time. It has been found that the calculation of the discharge delay time is easily affected by a change in the quiescent time.

However, in actual wire electric discharge machining, the quiescent time is often changed. For example, when it is discriminated that a machining gap voltage is low and a machining gap is about to short-circuit, the quiescent time is greatly extended to prevent disconnection due to concentrated occurrence of an electric discharge in a short time. When a machining amount suddenly changes in a corner portion or a cutting start portion of workpiece, to reduce an electric discharge frequency to stabilize machining, the quiescent time is sometimes greatly extended. When the number of times of voltage application is not taken into account under a condition that a predetermined measurement period for measuring a discharge delay time is fixed in this way, the integrated value of the discharge delay time changes according to the change in the quiescent time. Therefore, if it is attempted to control the integrated value to a fixed value, a groove width after the machining is not fixed.

(3) In the technique disclosed in Japanese Patent Application Laid-open No. 7-246519, the number of times of electric discharge in every predetermined period is detected and the period is divided by the detected number of times of electric discharge to calculate an average voltage application time per discharge. An energization time and a quiescent time set in advance are subtracted from the calculated average voltage application time to calculate a no-load time.

In this no-load time calculation system, the energization time and the quiescent time are fixed. However, in actual machining control, when a machining gap state is close to a short circuit, for prevention of disconnection, the energization time is reduced or the quiescent time is extended to adjust machining energy to be small. To cope with a sudden change in a machining amount in a corner portion of workpiece, the quiescent time is intentionally increased. In this way, machining is advanced while the energization time and the quiescent time are dynamically changed by various kinds of control. Therefore, on the premise that the energization time and the quiescent time are fixed, a discharge delay time is not correctly calculated.

(4) In the technique disclosed in Japanese Patent Application Laid-open No. 7-246519, the number of times of electric discharge is detected in the measurement period and the measurement period is divided by the detected number of times of electric discharge to calculate an average voltage application time.

However, the calculation of the average voltage application time is based on the premise that an electric discharge is performed every time. It is not assumed that voltage application is discontinued while electric discharge does not occur. As a result, in the case of FIG. 2, since the discharge delay time measurement period is 350 μs, the number of times of electric discharge is three times, the energization time is 10 μs, and the quiescent time is 50 μs, a no-load time in this period is 350 μs/three times—(10 μs+50 μs)=about 57 μs.

On the other hand, in the case of FIG. 3, the number of times of electric discharge is three times as in FIG. 2, the energization time is 10 μs, and the quiescent time is 25 μs. Therefore, a no-load time in this period (350 μs) is 350 μs/three times—(10 μs+25 μs)=about 82 μs.

That is, according to the technique disclosed in Japanese Patent Application Laid-open No. 7-246519, the no-load time (82 μs) in the case of FIG. 3 increases +44% compared with the no-load time (57 μs) in the case of FIG. 2. On the other hand, according to "the calculation method for an accurate discharge delay time" explained in (2), the no-load time (34 μs) in the case of FIG. 3 increases only +10% compared with the no-load time (31 μs) in the case of FIG. 2. In this way, in the technique disclosed in Japanese Patent Application Laid-open No. 7-246519, a change in the discharge delay time between the case of FIG. 2 and the case of FIG. 3 is an increase of (44−10=)+34% compared with "the calculation method for an accurate discharge delay time".

As explained above, when only the number of times of electric discharge is taken into account under the fixed measurement period, the no-load time greatly changes according to the change in the quiescent time. Therefore, when it is attempted to control the no-load time to a fixed value, a groove width after machining is not fixed.

Japanese Patent Application Laid-open No. 7-246519 describes that, in finishing in which an application frequency is about 1 MHz, since the no-load time decreases, it is difficult to detect the no-load time. Even in current wire electric discharge machines, detection with a clock frequency (detection frequency) of several ten megahertz to several hundred megahertz are possible. Therefore, there is no problem in the measurement of the no-load time at 1 MHz. Conversely, as in Japanese Patent Application Laid-open No. 7-246519, it is extremely difficult to accurately distinguish "electric discharge" and "short circuit" and detect the number of times of electric discharge with an analog circuit in high-frequency finishing in which a frequency is several kilohertz to several megahertz.

(5) Japanese Patent Application Laid-open No. 2003-165030 discloses a method of measuring a machining gap average voltage including a quiescent time according to the conventional technique and calculating a machining gap average voltage not including the quiescent time, from the measured machining gap average voltage value and a set quiescent time. Therefore, a correction value for calculating a machining gap average voltage after correction excluding the quiescent time is prepared as a table in advance and the machining gap average voltage not including the quiescent time is calculated using the corrected machining gap average voltage that is calculated from the table.

However, to calculate a machining gap voltage equivalent to a discharge delay time, not only the quiescent time but also information concerning the number of times of voltage application is necessary. For example, when a machining gap average voltage is measured by an analog circuit at every fixed cycle, when the quiescent time is changed because of the reason explained above, the number of times of voltage application per unit time changes. Therefore, unless the number of times of voltage application is taken into account, it is impossible to calculate a machining gap voltage corresponding to a discharge delay time.

(6) On the other hand, in the case of the present invention, the number of times of voltage application in the predetermined measurement period for measuring a discharge delay time is taken into account. Therefore, even if the quiescent time changes, it is possible to suppress the influence of the change to be extremely small. As explained above, according to the present invention, a discharge delay integrated time obtained by integrating the discharge delay time in the predetermined measurement period and the number of times of voltage application in the predetermined measurement period for measuring a discharge delay time are measured. An average discharge delay time in every measurement period is calculated from the discharge delay integrated time and the number of times of voltage application. When the discharge delay time integrated time is represented as TDsum and the number of times of voltage application is represented as N, an average discharge delay time TD is represented as indicated by Expression (1) below.

$$TD\ \mu s = TDsum\ \mu s / N(\text{times}) \quad (1)$$

Expression (1) is exactly "the calculation method for an accurate discharge delay time" explained in (2).

From Expression (1), in the case of FIG. 2, the average discharge delay time TD=155/5=31 µs. In the case of FIG. 3, the average discharge delay time TD=205/6=34 µs. According to a measurement method for an accurate average discharge delay time of the present invention, the calculation result of the accurate average discharge delay time is the same as the calculation result of the accurate discharge delay time, therefore a correct measurement is possible.

In the present invention, the measurement period is a fixed length of time set in advance. It is likely that measurement of a discharge delay time at a measurement start time and at a measurement end time and detection of the number of times of electric discharge are performed in the middle of voltage application. Therefore, it is likely that the measurement and the detection are measurement error factors. Measurement errors that could occur at the measurement start time and at the measurement end time can be eliminated by extending the measurement period (a temporal length from the measurement start to the measurement end).

When a gap amount between a workpiece and a wire electrode is controlled via software using the average discharge delay time obtained by the present invention or a machining gap voltage value based on the average discharge delay time, several milliseconds is necessary as a general control cycle. If the control cycle is set to 2 milliseconds and the discharge delay time measurement period is set to 2 milliseconds, even in an example of rough machining in which a voltage application time is long, several times of voltage application is included. Therefore, errors in two times in total at the start and the end of the measurement period are changed to a level not affecting measurement by averaging processing.

On the other hand, as in Japanese Patent Application Laid-open No. 55-101333 and Japanese Patent Application Laid-open No. 2-109633, when a value obtained by integrating the discharge delay time in every predetermined time is used, even if the measurement time is extended, an error inevitably remains at a rate calculated from FIGS. 2 and 3. Similarly, in the system disclosed in Japanese Patent Application Laid-open No. 7-246519, even if the measurement time is extended, the number of times of voltage application in the case without occurrence of electric discharge is included at the same rate. Therefore, the error calculated from FIGS. 2 and 3 is not eliminated.

On the other hand, the present invention adopts the calculation method for an accurate discharge delay time. Therefore, compared with the conventional techniques, it is possible to calculate an accurate discharge delay time. Further, by setting a measurement period to about 1 millisecond, error factors at the measurement start and end can be suppressed to a degree not affecting the measurement by averaging processing. In particular, as a frequency is higher, the influence of the error factors is further reduced by the averaging processing. Therefore, no problem occurs.

In the present invention, an integrated value of a discharge delay time and the number of times of voltage application are measured for a predetermined measurement period and an average discharge delay time is calculated. As a result, even if a rate of a quiescent time included in the measurement period changes, it is possible to accurately measure an average of discharge delay times corresponding to the number of times of voltage application.

When a machining gap voltage is calculated using the average discharge delay time calculated by the present invention and a relative distance between a workpiece and a wire electrode is controlled to fix the machining gap voltage, machining is not affected by the quiescent time. Therefore, as explained above, even if a large quiescent time is inserted at a corner portion, feed speed does not decrease. Therefore, it is possible to machine the workpiece without reducing machining speed while reducing an electric discharge frequency by inserting the quiescent time and keeping a machining amount suppressed.

A second example of the machining control executed by the wire electric discharge machine is explained.

In this example, a discharge delay integrated time and the number of times of voltage application in the predetermined measurement period are calculated by the discharge delay integrated time measuring unit and the number-of-times-of-voltage-application counting unit concerning both or any one of the case in which a machining gap voltage is a positive polarity and the case in which the machining gap voltage is a negative polarity. An average discharge delay time with respect to a polarity is calculated in every predetermined measurement period by the average discharge delay calculating unit.

In discharge machining, an applied voltage at one polarity is set higher than an applied voltage at the other polarity for the purpose of an increase in an electric discharge probability on the positive polarity side or the negative polarity side, electric anticorrosion for workpiece, and the like. In the case of such a voltage waveform, in the techniques disclosed in Japanese Patent Application Laid-open No. 50-1499, Japanese Patent Application Laid-open No. 55-101333, and Japanese Patent Application Laid-open No. 2-109633, a groove width after machining is not fixed. This is because, since the prior techniques are based on the premise that the same voltage is applied at the positive polarity and the negative polarity and a central value of a discharge delay time corresponding to a machining gap is always equal, the techniques cannot be adapted to the case where an applied voltage at one polarity is set higher than an applied voltage at the other polarity.

On the other hand, according to this example, by measuring an average discharge delay time at both of or any one of the positive polarity and the negative polarity, it is possible to accurately obtain a discharge delay time corresponding to a machining gap state, even in such an application method.

Figure 4:
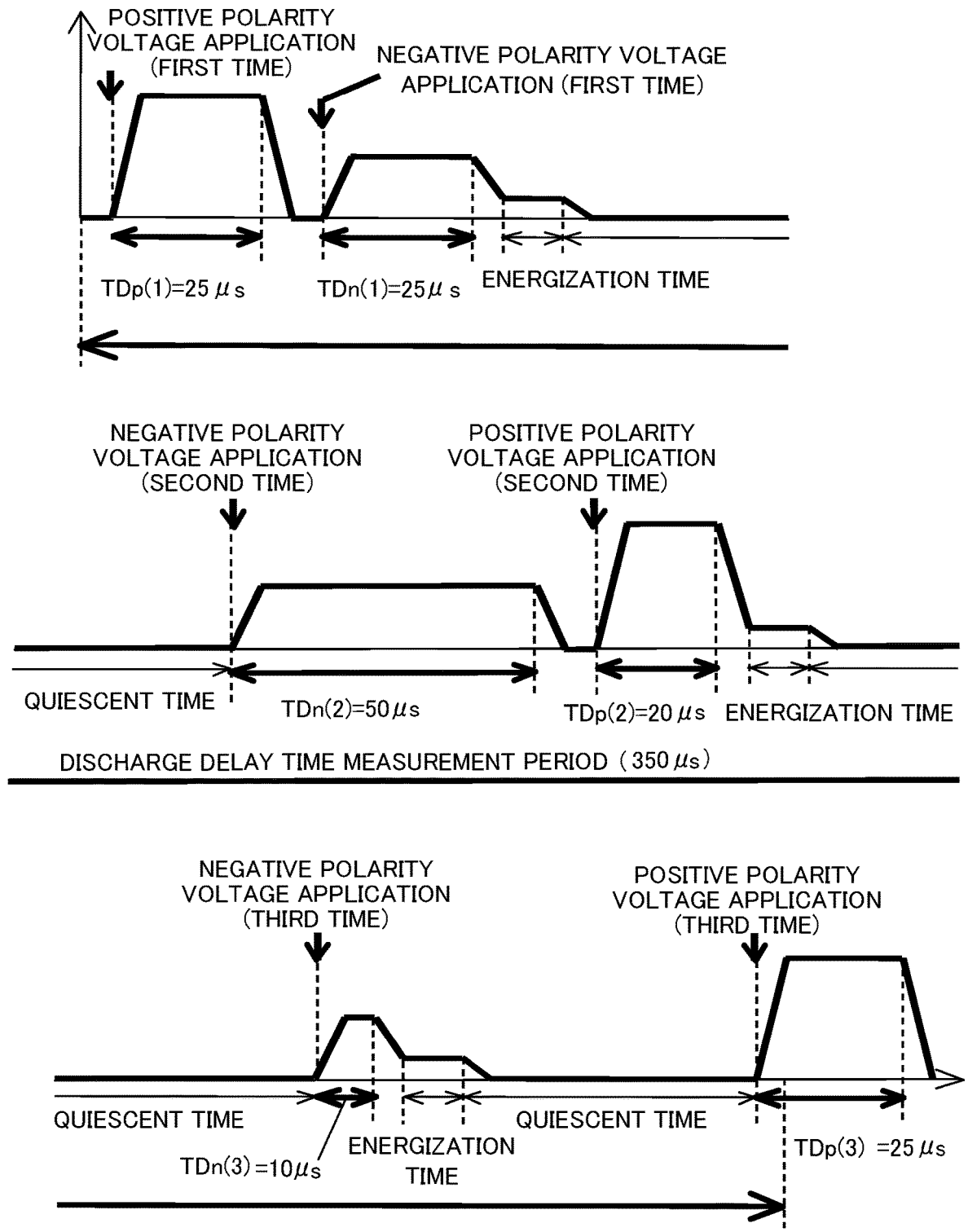
FIG. 4 is an example of a waveform obtained by full-wave rectifying a machining gap voltage waveform in which a machining gap applied voltage is different at a positive polarity and a negative polarity.

FIG. 4 is an example of a waveform obtained by full-wave rectifying a machining gap voltage waveform in which a machining gap applied voltage is different at the positive polarity and the negative polarity. Electric discharge does not occur in the first time of voltage application at the positive polarity, the second time of voltage application at the negative polarity, and the third time of voltage application at the positive polarity. When electric discharge does not occur, in the case of the positive polarity, the voltage application is discontinued at 25 μs (see the first time of the positive polarity voltage application). In the case of the negative polarity, the voltage application is discontinued at 50 μs (see the second time of the positive polarity voltage application). In this way, the discontinuation time of the voltage application is varied in the case of the positive polarity voltage application and the case of the negative polarity voltage application. This is because, since values of applied voltages are different at the positive polarity and the negative polarity, an application time is intentionally changed to reduce a machining gap average voltage to zero when electric discharge does not occur at all.

Since the applied voltage is different at the positive polarity and the negative polarity, a correlation between a gap amount of a machining gap and a discharge delay time is different at the positive polarity and the negative polarity. Therefore, concerning the waveform shown in FIG. 4, when an average discharge delay time is calculated using a method used in case where the applied voltage is the same at the positive polarity and the negative polarity, an accurate value is not obtained. Therefore, to obtain an accurate average discharge delay time, it is sufficient to half-wave rectify a machining gap voltage waveform to extract a waveform of only the positive polarity or the negative polarity and calculate an average discharge delay time for each waveform of the positive polarity or the negative polarity that is extracted.

Figure 5:
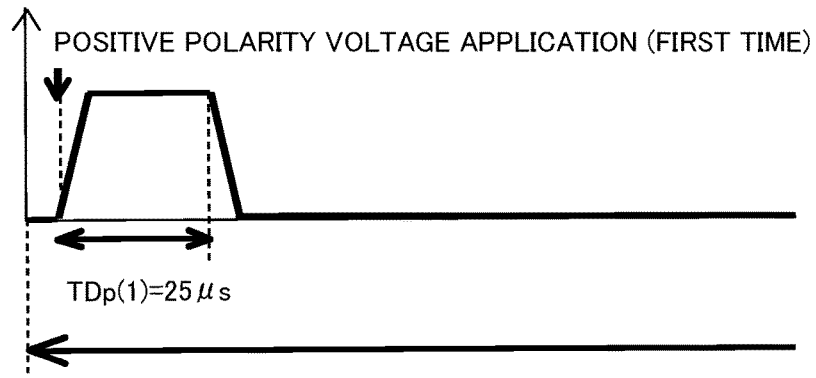
FIG. 5 is an example of a waveform obtained by half-wave rectifying only the positive polarity side of the machining gap voltage waveform of FIG. 4 in which the machining gap applied voltage is different at the positive polarity and the negative polarity.
Figure 5:
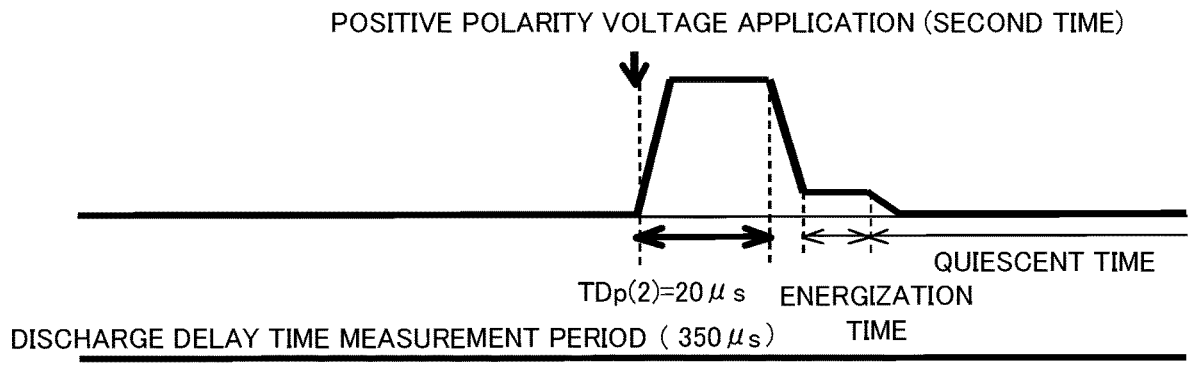
Figure 5:
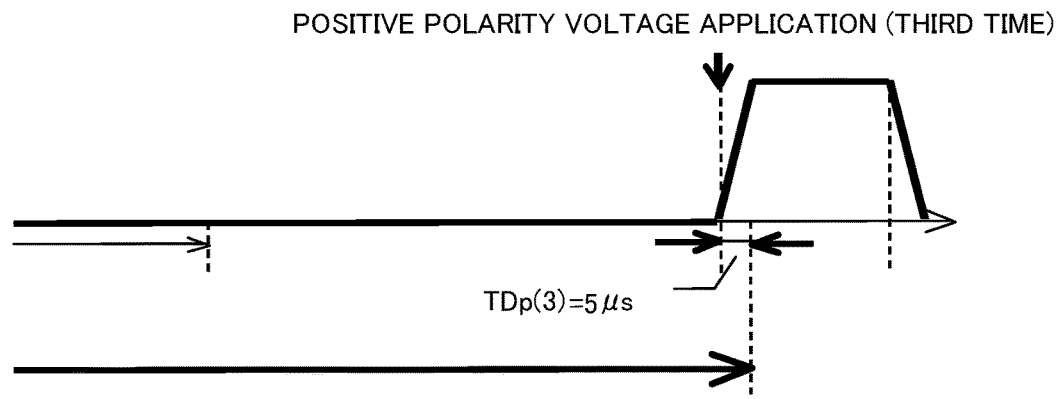
Figure 6:
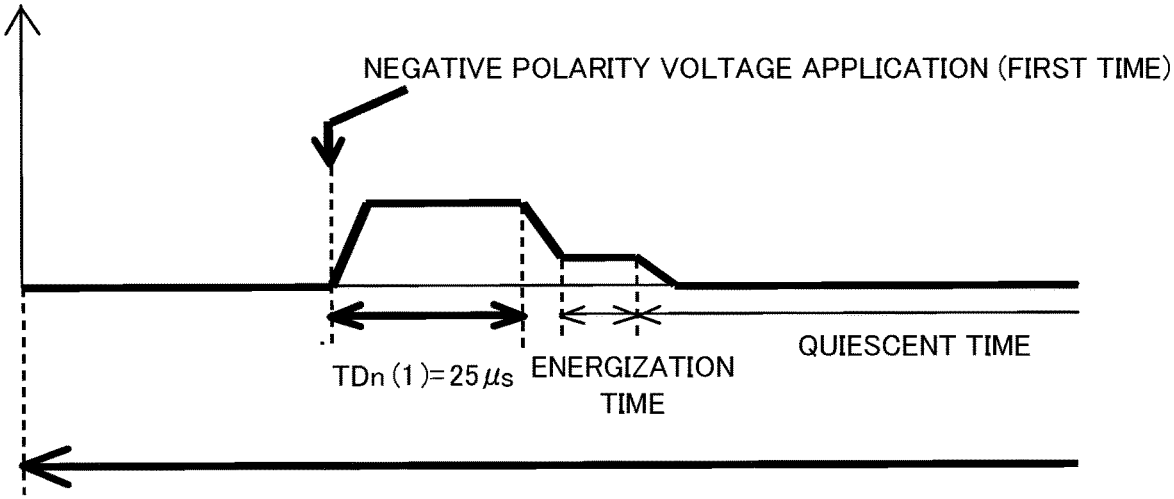
FIG. 6 is an example of a waveform obtained by half-wave rectifying only the negative polarity side of the machining gap voltage waveform of FIG. 4 in which the machining gap applied voltage is different at the positive polarity and the negative polarity.
Figure 6:
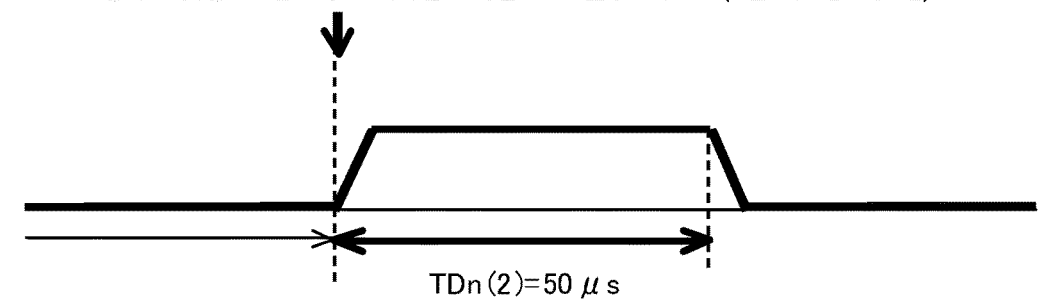
Figure 6:
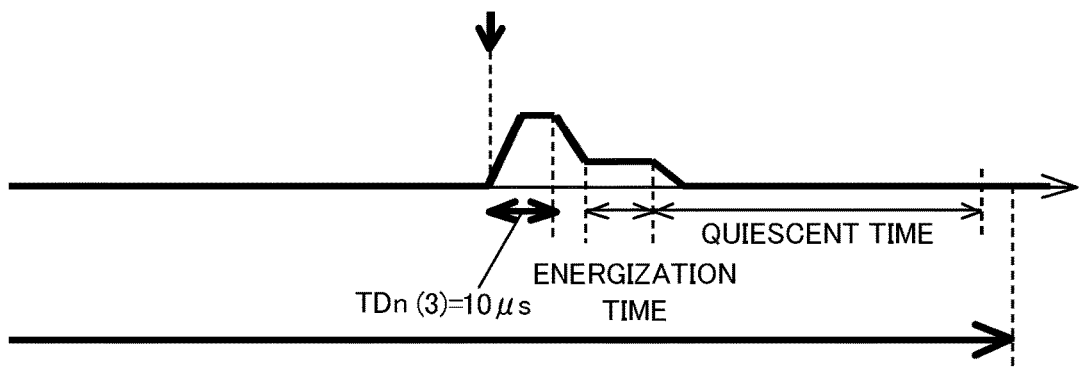

FIG. 5 is an example of a waveform obtained by half-wave rectifying only the positive polarity side of the machining gap voltage waveform of FIG. 4 in which the machining gap applied voltage is different at the positive polarity and the negative polarity. FIG. 6 is an example of a waveform obtained by half-wave rectifying only the negative polarity side of the machining gap voltage waveform of FIG. 4 in which the machining gap applied voltage is different at the positive polarity and the negative polarity.

When a discharge delay time integrated time at the positive polarity is represented as TDsum_p and the number of times of voltage application is represented as Np, an average discharge delay time TDp is represented as indicated by Expression (2) below.

$$TDp = TDsum\_p/Np \quad (2)$$

From FIG. 5, TDp={TDp(1)+TDp(2)+TDp(3)}/3=(25+20+5)/3=about 16 μs.

On the other hand, when a discharge delay time integrated time at the negative polarity is represented as TDsum_n and the number of times of voltage application is represented as Nn, an average discharge delay time TDn is represented as indicated by Expression (3) below.

$$TDn = TDsum\_n/Nn \quad (3)$$

From FIG. 6, TDn={TDn(1)+TDn(2)+TDn(3)}/3=(25+50+10)/3=about 28 μs.

In this way, even when the applied voltage is different at the positive polarity and the negative polarity, by calculating an average discharge delay time at each of the polarities, it is possible to calculate an accurate average discharge delay time corresponding to a machining gap. Average discharge delay times at both the polarities may be simultaneously calculated or an average discharge delay time at only one of the polarities may be calculated.

FIGS. 2 to 6 are waveform examples in which rough machining is assumed. After electric discharge detection, an energization time when a main current is fed and a quiescent time are provided. However, the present invention can also be applied to finishing.

In a high-frequency finishing circuit, in order to increase a frequency to increase a machining amount per unit time, in general, a voltage having a sine wave shape is applied to a machining gap to perform machining without providing a quiescent time. However, in such a machining method, a voltage changes as time elapses even if electric discharge does not occur. Moreover, even if electric discharge occurs, the machining gap is immediately charged and the voltage rises. Therefore, it is extremely difficult to detect electric discharge.

On the other hand, for example, as disclosed in Japanese Patent Application Laid-open No. 2010-280046, in the case of the finishing method for always inserting a quiescent time every time a voltage is applied to the machining gap, the method according to the present invention can be applied. Therefore, even in the finishing, it is possible to perform machining to fix the size of the machining gap while accurately measuring a discharge delay time corresponding to the machining gap.

A third example of the machining control executed by the wire electric discharge machine is explained.

In this example, a discharge delay integrated time measured by the discharge delay integrated time measuring unit is an integrated value of time when a waveform obtained by full-wave rectifying a machining gap voltage in a discharge delay time measurement period or a waveform obtained by half-wave rectifying any one of a positive voltage and a negative voltage is equal to or larger than a predetermined reference voltage value. The integrated value is divided by the number of times of voltage application in the predetermined measurement period for measuring a discharge delay time to calculate an average discharge delay time.

When a voltage applied to the machining gap is the same at the positive polarity and the negative polarity, a full-wave rectified waveform of a machining gap voltage is desirable. However, a half-wave rectified waveform at any one of the positive and negative polarities may be used. When a voltage applied to the machining gap is not equal at the positive polarity and the negative polarity, the detected machining gap voltage is compared with a predetermined reference voltage using the half-wave rectified waveform at any one of the polarities. The reference voltage may be able to be arbitrarily set. Alternatively, a rate to a power supply voltage may be provided as a parameter and the reference voltage may be automatically set according to a set machining voltage.

Figure 7:
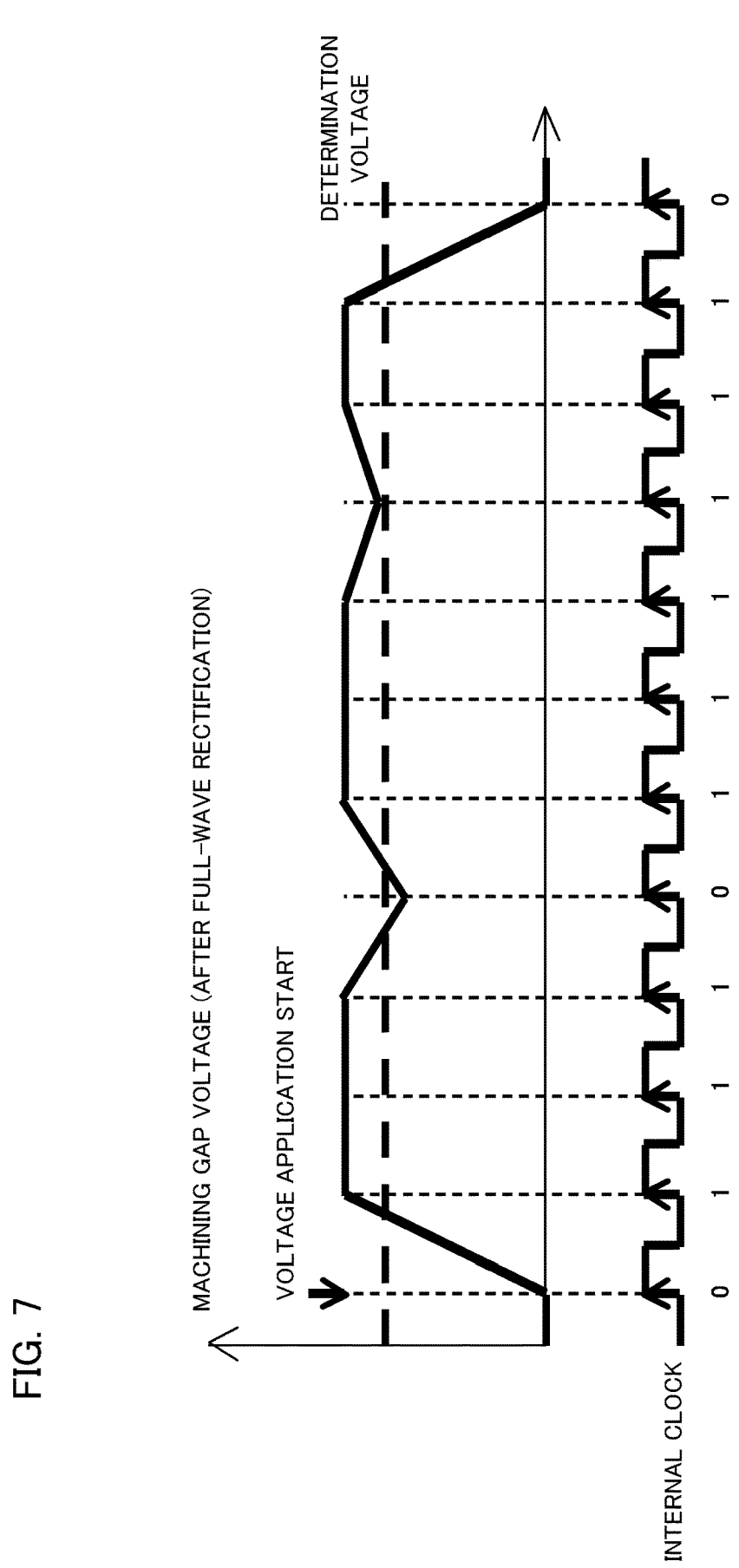
FIG. 7 is a diagram for explaining a measurement example in which a rising edge of an internal clock is set as a trigger and an output result of a comparator that compares a machining gap voltage at that point and a reference voltage is integrated.

A measurement example is shown in FIG. 7. A rising edge of an internal clock is set as a trigger and an output result of a comparator that compares a machining gap voltage at that point and a determination voltage (a reference voltage) is integrated. An integrated value within a predetermined measurement period is calculated by a counter circuit. A result of the calculation is transmitted to the numerical controller 14 shown in FIG. 1. In actual machining, after voltage application, although electric discharge does not occur, a leak current flows via sludge and a voltage sometimes drops at an instance.

FIG. 7 is the machining gap voltage waveform. During the voltage application, the voltage drops twice. In the voltage drop in the first time, since the voltage is lower than the determination voltage, an output of the comparator is 0 and a discharge delay integrated time does not increase. On the other hand, in the voltage drop in the second time, since the voltage exceeds the determination voltage, the voltage drop is counted as the discharge delay integrated time. It should be noted that a time delay occurs when the voltage actually rises from a voltage application start point and exceeds a threshold.

Figure 8:
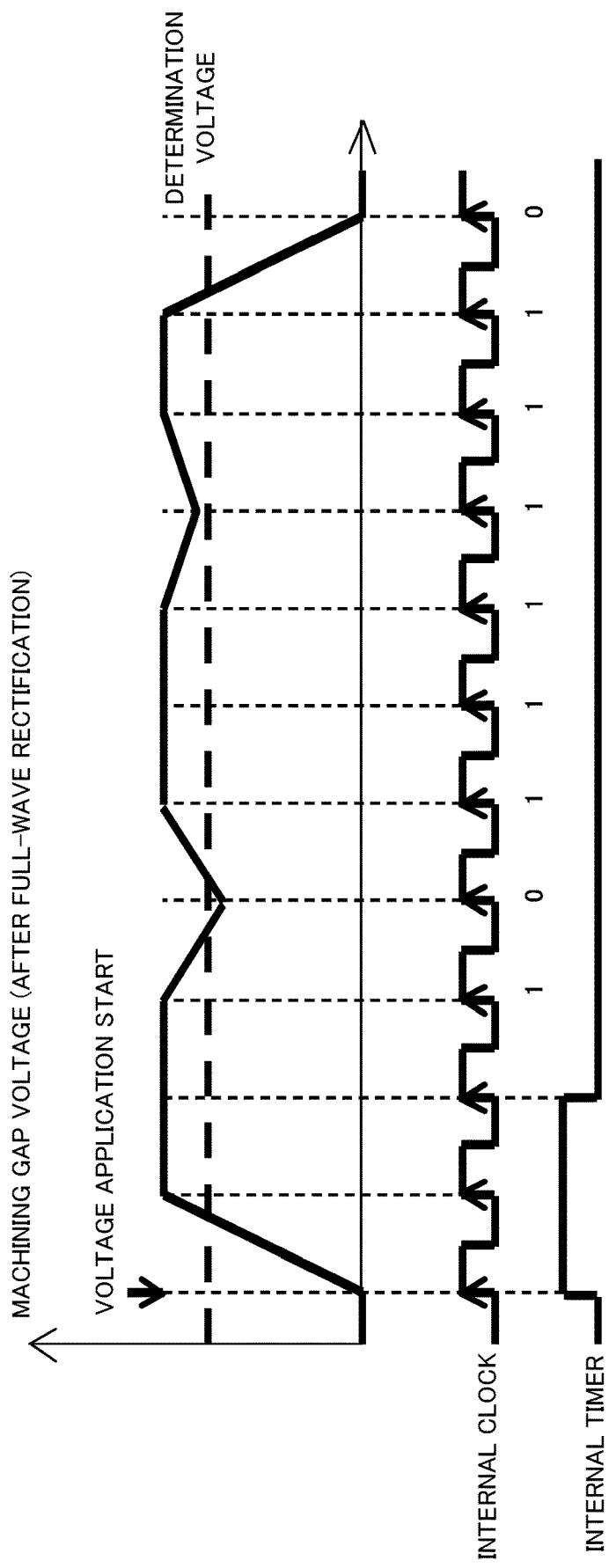
FIG. 8 is a diagram for explaining a measurement example in which a timer operating with a voltage application start as a trigger is provided and a result of the comparator is integrated after a timer end.

Therefore, as shown in FIG. 8, a timer that operates with a voltage application start as a trigger may be provided to integrate a result of the comparator after a timer operation is ended. All or a part of a determination result in a timer operation period may be corrected to be added to the discharge delay integrated time.

When FIGS. 7 and 8 are referred to, in explanation, a clock waveform having a low frequency compared with an actual machining gap voltage waveform is used. However, actually, a machining gap state can be discriminated using a clock of several ten to several hundred megahertz. A determination cycle can be set to about several ten to about several hundred nanoseconds. Therefore, it is possible to perform fine measurement accurately reflecting the machining gap state.

A fourth example of the machining control executed by the wire electric discharge machine is explained.

In this example, a discharge delay integrated time measured by the discharge delay integrated time measuring unit is an integrated value of time from a point when a waveform obtained by full-wave rectifying a machining gap voltage in a discharge delay time measurement period or a waveform obtained by half-wave rectifying any one of a positive voltage and a negative voltage is equal to or larger than a predetermined first reference voltage value to a point when the waveform is equal to or smaller than a predetermined second reference voltage value.

Figure 9:
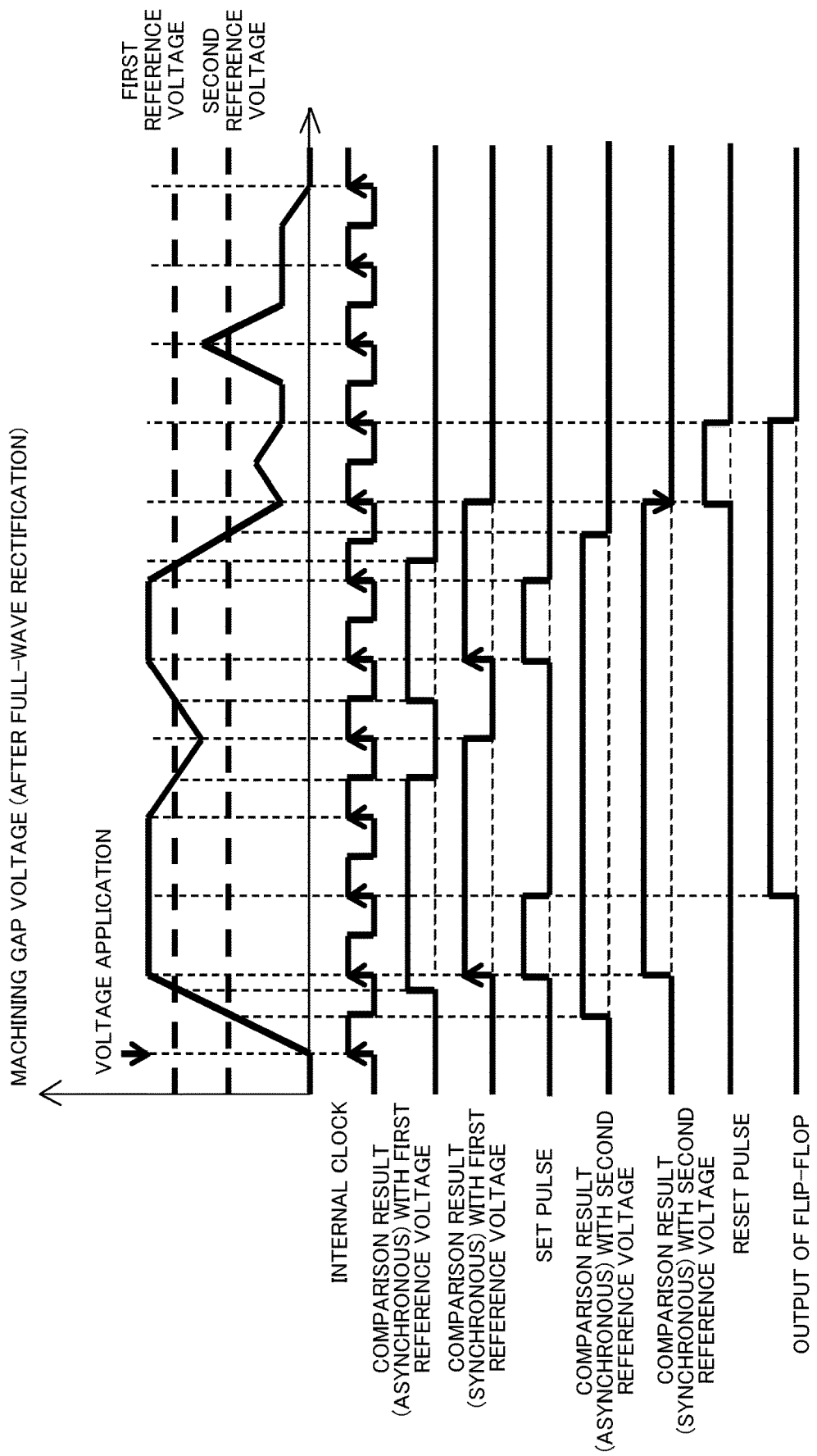
FIG. 9 is a diagram for explaining an example in which a discharge delay time is measured from a result obtained by comparing a full-wave rectified waveform of a machining gap voltage waveform with two reference voltages.

A measurement example is shown in FIG. 9 in which a result obtained by comparing a full-wave rectified waveform of a machining gap voltage waveform with two reference voltages (first and second reference voltages) is shown. A hysteresis characteristic can be given by providing a difference between the first reference voltage and the second reference voltage. A discharge delay time is measured after a voltage of a machining gap actually becomes sufficiently high (i.e., exceeds the first reference voltage). Therefore, it is possible to measure a more accurate discharge delay time.

A set pulse is formed from an edge where a comparison result (synchronization) with the first reference voltage changes from 0 to 1, a reset pulse is formed from an edge where a comparison result (synchronization) with the second reference voltage changes from 1 to 0, and the set pulse and the reset pulse are input to a synchronous flip-flop. Consequently, a pulse train from time when the machining gap voltage exceeds the first reference voltage until time when the machining gap voltage drops below the second reference voltage is formed. By counting the pulse train, it is possible to obtain an integrated value of a discharge delay time. Since the hysteresis characteristic is given, as shown in FIGS. 7 and 8, there is an advantage that the measurement is not affected by a voltage drop due to a leak current. When the first reference voltage and the second reference voltage are set to the same value, although the hysteresis characteristic is lost, the discharge delay integrated time measuring unit can be formed of a simple circuit including one reference voltage and one comparator.

A fifth example of the machining control executed by the wire electric discharge machine is explained.

In this example, a relative position between a workpiece and a wire electrode is controlled such that an average discharge delay time per voltage application in a predetermined measurement period calculated by the average discharge delay calculating unit coincides with a target value.

In the conventional control of the relative position between the workpiece and the wire electrode, a servo is controlled such that a machining gap average voltage obtained by converting a machining gap voltage into a direct-current voltage with an analog circuit is fixed or, as described in Japanese Patent Application Laid-open No. 55-101333 and Japanese Patent Application Laid-open No. 2-109633, a no-load voltage application time in a fixed period is measured and a servo is controlled such that the no-load voltage application time is fixed. As it is evident from the above explanation, these systems are affected by a change in the quiescent time forcibly inserted for preventing disconnection or the like and a change in the number of times of voltage application.

On the other hand, a machining gap voltage calculated by the present invention is not affected by a change in the forcibly-inserted quiescent time and a change in the number of times of voltage application. Therefore, it is possible to accurately calculate an average discharge delay time reflecting an actual size of a machining gap. By controlling a relative position between a workpiece and a wire electrode such that the average discharge delay time reaches a target value (reaches a fixed value), it is possible to perform machining to accurately fix the machining gap. Therefore, a groove width after the machining is fixed.

A sixth example of the machining control executed by the wire electric discharge machine is explained.

In this example, when an average discharge delay time per voltage application in a predetermined measurement period calculated by the average discharge delay calculating unit is smaller than a predetermined reference value, voltage application to a machining gap is not performed for a predetermined time.

Again, a discharge delay time calculated by the conventional techniques is affected by a quiescent time and the number of times of voltage application. On the other hand, an average discharge delay time calculated by the present invention is considered to accurately reflect a machining gap state because a discharge delay time corresponding to a machining gap is accurately measured to calculate a machining gap voltage.

That is, when the average discharge delay time calculated by the present invention is smaller than a value set in advance, it is determined that the machining gap is narrow and a short-circuit state is about to occur, as a result, voltage application is stopped for a period set in advance. This is effective for preventing a disconnection. A plurality of thresholds used for discrimination of a machining gap state may be prepared and change the length of an inserted quiescent time according to a rate of a decrease in the average discharge delay time. Alternatively, when an average discharge delay time smaller than a threshold continues, a longer quiescent time may be inserted.

A seventh example of the machining processing executed by the wire electric discharge machine is explained.

In this example, when an average discharge delay time per voltage application in a predetermined measurement period calculated by the average discharge delay calculating unit is smaller than a reference value set in advance, at least one of deceleration, a stop, and receding is applied to relative speed between a workpiece and a wire electrode (i.e., to shaft feed control).

The average discharge delay time in this example reflects a machining gap accurately. Therefore, when the average discharge delay time is smaller than a predetermined value, it is discriminated that the machining gap is about to short circuit. Any one of the deceleration, the stop, and the receding is applied to the shaft feed control. Consequently, it is possible to prevent the machining gap to short-circuit to disable machining or to prevent electric discharge from concentrating to cause disconnection.

Concerning which of the deceleration, the stop, and the receding is selected for the relative speed between the workpiece and the wire electrode, for example, three thresholds for detecting a decrease are provided for the average discharge delay time according to the present invention, the deceleration is selected when the average discharge delay time is smaller than the largest threshold, the stop is selected when the average discharge delay time is smaller than the next largest threshold, and the receding is selected when the average discharge delay time is smaller than the smallest threshold. Consequently, it is possible to perform machining while satisfactorily keeping the machining gap state.

Two thresholds or one threshold for detecting a decrease in the average discharge delay time may be provided to select any one of the deceleration, the stop, and the receding. A deceleration ratio may be changed or receding speed may be changed according to a degree of the decrease in the average discharge delay time. Time in which the average discharge delay time is smaller than a threshold may be measured. In this case, if the average discharge delay time is smaller than the threshold for a predetermined time or more, processing of the deceleration, the stop, or the receding may be performed.

An eighth example of the machining control executed by the wire electric discharge machine is explained.

In this example, time from a voltage application start until voltage application is discontinued when electric discharge does not occur or time from the voltage application start until the next voltage application is started is set as a machining gap voltage residual time. A rate of an average discharge delay time with respect to the machining gap voltage residual time is calculated from the average discharge delay time in every predetermined measurement time output from the average discharge delay calculating unit. The calculated rate is multiplied by a reference voltage to calculate a machining gap voltage value.

FIG. 10 is an example of a machining gap voltage waveform during rough machining. Electric discharge does not occur. A section A in FIG. 10 is time from the start of voltage application until the voltage application is discontinued because electric discharge is not detected for a predetermined time, although the voltage application is performed (a voltage application discontinuation time). A section B is a voltage cancel time for cancelling a residual voltage by, for example, connecting a resistor to a machining gap. A section C is a quiescent time in which neither the voltage application nor the voltage cancellation is performed. The section B may be extended to the section C so that the section C is not provided.

When time of the section A is represented as machining gap voltage residual time $T\mu s$, an average discharge delay time is represented as $TD\mu s$, and a reference voltage is represented as E, a machining gap voltage V based on a discharge delay time is calculated by Expression (4) below.

$$V = E \times TD/T \quad (4)$$

The sections A, B, and C are only command times for a voltage application circuit. The sections A, B, and C sometimes do not coincide with times observed from an actual machining gap voltage waveform. In that case, to bring the voltage application time closer to an actual voltage application time of the machining gap, not only the voltage application discontinuation time A but also all or a part of the voltage cancellation time B and the quiescent time C may be included in the machining gap voltage residual time T in the calculation thereof.

FIGS. 11 and 12 are an example of a machining gap voltage waveform during finishing for performing processing only with energy charged in stray capacitance of a machining gap and capacitance of a cable rather than performing discharge detection and applying a large current for machining as in the rough machining.

In high-frequency machining at 1 MHz or higher, as shown in FIG. 11, the voltage cancellation time (the section B) is not provided in every interval between voltage application and voltage application. After voltage application is continuously performed the number of times set in advance, for the purpose of reducing an average voltage, the voltage cancellation time and the quiescent time or only the quiescent time is often provided. Alternatively, when it is unnecessary to provide the quiescent time, neither the voltage cancellation time nor the quiescent time is provided to always continuously apply a voltage. In this case, the machining gap voltage residual time T is the voltage application discontinuation time A.

FIG. 12 is an example of a finishing method for always inserting at least a quiescent time equal to or longer than an application time in every voltage application to a machining gap as disclosed in Japanese Patent Application Laid-open No. 2010-280046. In the case of finishing at several hundred kilohertz or higher, even if the quiescent time C is provided after the voltage application discontinuation time A, unless electric discharge occurs, a machining gap voltage continues to slightly decrease because of a leak current but retains approximately a voltage value before the quiescent time. In such a case, the machining gap voltage residual time T is a value obtained by adding a discharge waiting time D to the voltage application discontinuation time A. When the leak current in the machining gap is large and a voltage drop in the discharge waiting time D is large, the machining gap voltage residual time T may be equal to the voltage application discontinuation time A.

A discharge delay time integrated by the discharge delay integrated time measuring unit means "a no-load time (a discharge delay time) from application of a voltage to a machining gap until occurrence of electric discharge". However, in this example, the "application of a voltage to a machining gap" includes not only a state in which a voltage application command is issued but also time in which a sufficiently high residual voltage remains in the machining gap even if the voltage application command is not issued. That is, in the case shown in FIG. 12, "a no-load time (a discharge delay time) from application of a voltage to a machining gap until occurrence of an electric discharge" is time of about A+D.

When attention is paid to the expressions of the machining gap voltage and the average discharge delay time, from Expression (1) and Expression (4), the following expression is obtained:

$$V = E \times TDsum/N/T \qquad (5)$$
$$= E \times \{TDsum/(N \times T)\}.$$

TDsum: discharge delay time integrated time (μs) in a predetermined time
N: Number of times of voltage application in the predetermined time
T: Machining gap voltage residual time (μs)
TD: Average discharge delay time (μs)
E: Reference voltage E
V: Machining gap voltage based on a discharge delay time In the case of the finishing shown in FIGS. 11 and 12, as explained above, unlike the rough machining, the voltage application is not discontinued halfway even if electric discharge occurs. Therefore, (N×T) of Expression (5) is "number of times application in a measurement period"× "machining gap voltage residual time" and is approximately equal to time obtained by removing, from the measurement period, time when a sufficiently high residual voltage remains in the machining gap and is time obtained by removing the quiescent time C from the machining gap voltage waveforms shown in FIGS. 10, 11, and 12. That is, according to this example, in the case of the finishing shown in FIGS. 11 and 12, it is seen that it is possible to calculate an average voltage corresponding to a discharge delay time by multiplying, by a reference voltage, a rate of a discharge delay integrated time with respect to time obtained by removing the quiescent time from the measurement period.

Several modifications of the eighth example of the machining control are explained.

(i) In a first modification, a relative position between a workpiece and a wire electrode is controlled such that a machining gap voltage value based on the average discharge delay time coincides with a target value. This machining gap voltage is a machining gap voltage based on an average discharge delay time reflecting an actual machining gap and is not affected by a change in a forcibly inserted quiescent time and a change in the number of times of voltage application.

Therefore, the machining gap voltage is calculated in every discharge delay time measurement period and the relative position between the workpiece and the wire electrode is controlled such that the calculated machining gap voltage coincides with a target value. Consequently, the machining gap is kept fixed and a groove width after machining is fixed.

By converting the average discharge delay time into a machining gap voltage, various control methods concerning servo feeding, which are generally used conventionally, using a machining gap average voltage by an analog circuit can be applied. Therefore, there is an advantage that it is easier to introduce this modification than building a new control method using the average discharge delay time.

Further, in the case of the conventional techniques, when a large quiescent time is inserted, a calculated machining gap average voltage greatly drops because the machining gap average voltage is affected by the quiescent time as explained above. As a result, in the average voltage fixed feeding control, feed speed is extremely low, machining accuracy is deteriorated, and a machining time increases. On the other hand, in the case of a machining gap voltage based on the average discharge delay time, since the machining gap voltage is not affected by the quiescent time, even if a large quiescent time is inserted, machining speed does not suddenly decrease and machining can be performed.

(ii) In a second modification, when a machining gap voltage value based on the average discharge delay time is smaller than a predetermined reference value, voltage application to a machining gap is not performed for a predetermined time. Effects same as the effects in the sixth example can be obtained.

(iii) In a third modification, when a machining gap voltage value based on the average discharge delay time is smaller than a predetermined reference value, at least one of deceleration, a stop, and receding is applied to relative speed between a workpiece and a wire electrode. Effects same as the effects in the seventh example of the machining control can be obtained.

A ninth example of the machining control executed by the wire electric discharge machine is explained.

In this example, the wire electric discharge machine further includes a machining gap average voltage measuring unit. The machining gap average voltage measuring unit calculates a machining gap average voltage by full-wave rectifying and averaging a voltage waveform of the machining gap, or averaging a voltage waveform that is half-wave rectified for each of polarities to calculate an average voltage for each of the polarities, and adding up average voltages.

Several modifications of the ninth example of the machining control are explained.

(i) In a first modification, machining gap average voltage fixed servo feed control is performed using a machining gap average voltage calculated by the machining gap average voltage measuring unit. When an average discharge delay time calculated by the average discharge delay time calculating unit is smaller than a predetermined reference value, voltage application to a machining gap is not performed for a predetermined time.

In this modification, as relative position control between a wire electrode and a workpiece, the machining gap average voltage fixed servo feed control, which is the conventional technique, is performed rather than the control performed in the fifth example and the eighth example (the first modification) of the machining control explained above (the control using the average discharge delay time or the control using the machining gap average voltage based on the average discharge delay time). A machining gap is accurately measured using the average discharge delay time calculated by the average discharge delay time calculating unit. When the calculated average discharge delay time is smaller than a reference value set in advance, voltage application to the machining gap is not performed for a predetermined time. Consequently, it is possible to perform stable machining.

As a result, in this modification, prior art technique concerning feed control can be directly diverted. Therefore, it is possible to obtain the same machining accuracy without necessity of correcting machining conditions or a feed control system. Moreover, effects same as the effects in the sixth example of the machining control can be obtained.

As a unit that calculates a machining gap average voltage, the analog circuit explained above may be used. Alternatively, a machining gap voltage waveform may be subjected to A/D conversion at high speed to calculate an average voltage through digital processing.

(ii) In a second modification, when a machining gap voltage value based on the average discharge delay time is smaller than a predetermined reference value, at least one of deceleration, a stop, and receding is applied to relative speed between a workpiece and a wire electrode.

As in the first modification, as relative position control between a wire electrode and a workpiece, the machining gap average voltage fixed servo feed control, which is the conventional technique, is performed rather than the control performed in the fifth example or the eighth example (the first modification) of the machining control explained above. A machining gap is accurately measured using the average discharge delay time calculated by the average discharge delay time calculating unit. When the calculated average discharge delay time is smaller than a reference value set in advance, at least one of the deceleration, the stop, and the receding is applied to the relative speed between the workpiece and the wire electrode. Consequently, it is possible to perform stable machining.

As a result, prior art technique concerning feed control can be directly diverted. Therefore, it is possible to obtain the same machining accuracy without necessity of correcting machining conditions or a feed control system. Moreover, effects same as the effects in the seventh example of the machining control can be obtained.

A tenth example of the machining control executed by the wire electric discharge machine is explained.

In this example, the wire electric discharge machine further includes a state signal output unit and a state counting unit. The state signal output unit discriminates a voltage waveform applied to a machining gap as any one state of opening, electric discharge, and short circuit, and outputs a state signal. In a measurement period of the average discharge delay time, the state counting unit counts a state signal output by the state signal output unit every time a voltage is applied to the machining gap, and counts at least two or more of the number of times of opening, the number of times of electric discharge, and the number of times of short circuit in the measurement period.

Several modifications of the tenth example of the machining control are explained.

(i) In the first modification, servo feed speed is calculated using at least one or more of the number of times of opening, the number of times of electric discharge, and the number of times of short circuit calculated by the state counting unit to perform servo feed control. When an average discharge delay time calculated by the discharge delay time calculating unit is smaller than a predetermined reference value, voltage application to a machining gap is not performed for a predetermined time.

As relative position control between a wire electrode and a workpiece, rather than the control performed in the fifth example or the eighth example (the first modification) of the machining control, the conventional technique for calculating servo feed speed from a machining gap state discrimination signal such as the number of times of opening, the number of times of electric discharge, or the number of times of short circuit as described in Japanese Patent Application Laid-open No. 2002-254250 and Japanese Patent Application Laid-open No. 2004-283968 is used. A gap amount of the machining gap is accurately measured using an average discharge delay time calculated by the average discharge delay time calculating unit. When the calculated average discharge delay time is smaller than a reference value set in advance, voltage application to the machining gap is not performed for a predetermined time. Consequently, it is possible to perform stable machining.

As a result, prior art technique concerning feed control can be directly diverted. Therefore, it is possible to obtain the same machining accuracy without necessity of correcting machining conditions and a feed control system. Moreover, effects same as the effects in the sixth example of the machining control can be obtained.

(ii) In a second modification, servo feed speed is calculated using at least one or more of the number of times of opening, the number of times of electric discharge, and the number of times of short circuit calculated by the state counting unit to perform servo feed control. When an average discharge delay time calculated by the discharge delay time calculating unit is smaller than a predetermined reference value, at least one of deceleration, a stop, and receding is applied to relative speed between a workpiece and a wire electrode.

In this modification, as in the first modification, as relative position control between a wire electrode and a workpiece, rather than the control performed in the fifth example or the eighth example (the first modification) of the machining control, the conventional technique for calculating servo feed speed from a machining gap state discrimination signal such as the number of times of opening, the number of times of electric discharge, and the number of times of short circuit as described in Japanese Patent Application Laid-open No. 2002-254250 and Japanese Patent Application Laid-open No. 2004-283968 is used. A machining gap is accurately measured using an average discharge delay time calculated by the average discharge delay time calculating unit. When the calculated average discharge delay time is smaller than a reference value set in advance, at least one of the deceleration, the stop, and the receding is applied to the relative speed between the workpiece and the wire electrode. Consequently, it is possible to perform stable machining.

As in the first modification, prior art technique concerning feed control can be directly diverted. Therefore, it is possible to obtain the same machining accuracy without necessity of correcting machining conditions and a feed control system. Moreover, effects same as the effects in the seventh example of the machining control can be obtained.

An eleventh example of the machining control executed by the wire electric discharge machine is explained.

In this example, voltage application is performed such that a quiescent time equal to or longer than an application time is provided every time a voltage is applied to a machining gap, whereby a voltage waveform is formed in a trapezoidal wave shape. For example, as explained concerning the eighth example of the machining control, a machining gap voltage waveform shown in FIG. 12 is used. In the quiescent time C, a machining gap voltage is retained by electric charges charged in stray capacitance of the machining gap. However, since voltage application is not performed in the quiescent time C, when electric discharge occurs, the machining gap voltage instantaneously drops. Thereafter, the voltage does not rise again. According to this modification, since the waveform of the trapezoidal wave shape in which the quiescent time C is sufficiently long is used, it is possible to accurately measure an average discharge delay time. Therefore, it is possible to accurately estimate a gap amount of the machining gap. It is possible to perform highly accurate and stable machining.

The invention claimed is:

1. A wire electric discharge machine that applies, while moving a relative position of a table with respect to a wire electrode, a voltage to a machining gap between the wire electrode and a workpiece arranged on the table to generate electric discharge and machines the workpiece, the wire electric discharge machine comprising:

- a measuring unit configured to measure, as a discharge delay time, a no-load time from the application of the voltage to the machining gap until occurrence of the electric discharge, and integrate the measured discharge delay time over a predetermined measurement period to calculate a discharge delay integrated time;
- a counting unit configured to count the number of times of the voltage application in the predetermined measurement period; and
- an average discharge delay time calculating unit configured to calculate an average discharge delay time per voltage application in the predetermined measurement period from the discharge delay integrated time calculated by the measuring unit and the number of times of voltage application calculated by the counting unit,
- wherein, when the average discharge delay time is smaller than a predetermined reference value, at least one of deceleration, a stop, and receding is applied to a relative speed between the workpiece and the wire electrode.

* * * * *